United States Patent
Lansford

(10) Patent No.: US 6,594,302 B1
(45) Date of Patent: Jul. 15, 2003

(54) FIXED FREQUENCY TRANSCEIVER FOR USE IN A FREQUENCY HOPPING SYSTEM

(75) Inventor: James L. Lansford, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/374,550

(22) Filed: Aug. 13, 1999

(51) Int. Cl.$^7$ .............................. H04B 1/69; H04L 12/43
(52) U.S. Cl. .......................................... 375/133; 370/459
(58) Field of Search ................................ 375/133–376; 455/226.2; 370/459; 709/228

(56) References Cited

U.S. PATENT DOCUMENTS

| | | | | |
|---|---|---|---|---|
| 5,696,903 A | * | 12/1997 | Mahany | ........................ 709/228 |
| 6,078,795 A | * | 6/2000 | Miyazaki | .................. 455/226.2 |
| 6,292,494 B1 | * | 9/2001 | Baker et al. | .................. 370/459 |
| 6,400,751 B1 | * | 6/2002 | Rodgers | ....................... 375/132 |

* cited by examiner

Primary Examiner—Stephen Chin
Assistant Examiner—Lawrence Williams
(74) Attorney, Agent, or Firm—Blakely, Sokoloff, Taylor & Zafman LLP

(57) ABSTRACT

A non-frequency-hopping node and a method for using such a node to transmit and receive data in a frequency-hopping system are disclosed.

In one embodiment, a non-frequency-hopping node interacts with a frequency-hopping spread-spectrum (FHSS) system, which comprises a wireless medium or electromagnetic airwaves, a frequency-hopping node coupled to the wireless medium and an access point coupled to the wireless medium. The non-frequency-hopping node connects to the wireless medium and listens for an active signal generated by the FHSS system on a predetermined frequency channel. Upon detecting the active signal, the non-frequency-hopping node exchanges information with the FHSS system on the predetermined frequency channel.

18 Claims, 8 Drawing Sheets

FIXED FREQUENCY TRANSCEIVER FOR USE IN A FREQUENCY HOPPING SYSTEM

FIELD OF THE INVENTION

This invention relates to wireless networks generally and particularly to non-frequency-hopping nodes operating in a frequency-hopping system.

BACKGROUND OF THE INVENTION

A wireless network is a flexible data communication medium implemented as an extension for, or as an alternative to, a wired network. By using radio frequency (RF) technology, wireless networks transmit and receive data over air, minimizing the need and the cost typically associated with wired connections. Moreover, wireless networks offer mobility and flexibility for users. For example, doctors and nurses in hospitals are able to use hand-held devices or notebook computers to access patient information from a server through wireless networks without having to search for a physical connection into which to plug.

Many wireless networks use spread-spectrum technology, a wideband radio frequency technique originally developed by the military for use in reliable, secure and mission-critical communication systems. Spread-spectrum is designed to trade off bandwidth efficiency for data reliability, integrity and security. One of the techniques for spread spectrum modulation is frequency-hopping spread-spectrum (FHSS). Specifically, FHSS uses a narrowband carrier that changes frequency in a pattern known to both a FHSS transmitter and a FHSS receiver. Because of this pattern of frequency changes or hops, to an unintended receiver, FHSS signals appear to be-short-duration interference bursts.

In order to tune to the different frequency channels in the pattern of frequency changes, systems utilizing FHSS employ some frequency switching components, such as pseudo-noise generator (or also known as pseudo-random sequence generator) and frequency synthesizers. Even though frequency synthesizers represent a significant portion of the overall system cost, they are necessary for full performance of the FHSS systems (or also referred to as frequency-hopping systems). Nevertheless, devices begin to emerge, such as devices designed for home use, where full performance of the frequency-hopping system is not required. For instance, a thermostat in a home may periodically transmit the home's present in-door temperature through a wireless network to a server tracking conditions of this home. If this thermostat implements the described frequency synthesizer, the cost of the thermostat will most likely become prohibitively high in view of its functionality.

Therefore, in order to promote commercially viable wireless devices, which transmit relatively small amounts of information on an infrequent basis, a method is needed to produce such devices to operate in a frequency-hopping system.

SUMMARY OF THE INVENTION

A non-frequency-hopping node and a method for using such a node to transmit and receive data in a frequency-hopping system are disclosed.

In one embodiment, a non-frequency-hopping node interacts with a frequency-hopping spread-spectrum (FHSS) system, which comprises a wireless medium or electromagnetic airwaves, a frequency-hopping node coupled to the wireless medium and an access point coupled to the wireless medium. The non-frequency-hopping node connects to the wireless medium and listens for an active signal generated by the FHSS system on a predetermined frequency channel. Upon detecting the active signal, the non-frequency-hopping node exchanges information with the FHSS system on the predetermined frequency channel.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A non-frequency-hopping node and a method for using such a node to transmit and receive data in a frequency hopping system are disclosed. In the following description, numerous specific details are set forth, such as frequency modulation (FM) discriminator, Media Access Control (MAC), Voltage Control Oscillator (VCO), etc. in order to provide a thorough understanding of the present invention. However, it will be apparent to one of ordinary skill in the art that the invention may be practiced without these particular details. In other instances, well-known elements and theories such frequency-hopping, wireless networks, wired networks, frequency synthesizers, capture effect, listen-before-talk network protocol, frequency modulation (FM) discriminator, Media Access Control (MAC), Voltage Control Oscillator (VCO), etc. have not been discussed in special details in order to avoid obscuring the present invention.

In addition, the term, "frequency-hopping system", is used throughout the following discussion to refer to a frequency-hopping spread-spectrum (FHSS) system in a wireless network. A "frequency-hopping node" is also used throughout the following discussions to refer to a network node, which has a frequency synthesizer and applies a frequency-hopping algorithm. A node can be either an end system or a switching element in a network. Finally, a "non-frequency-hopping node", or a fixed frequency transceiver, refers to a network node, which does not have a frequency synthesizer and transfers data through one fixed frequency channel.

Figure 1A:
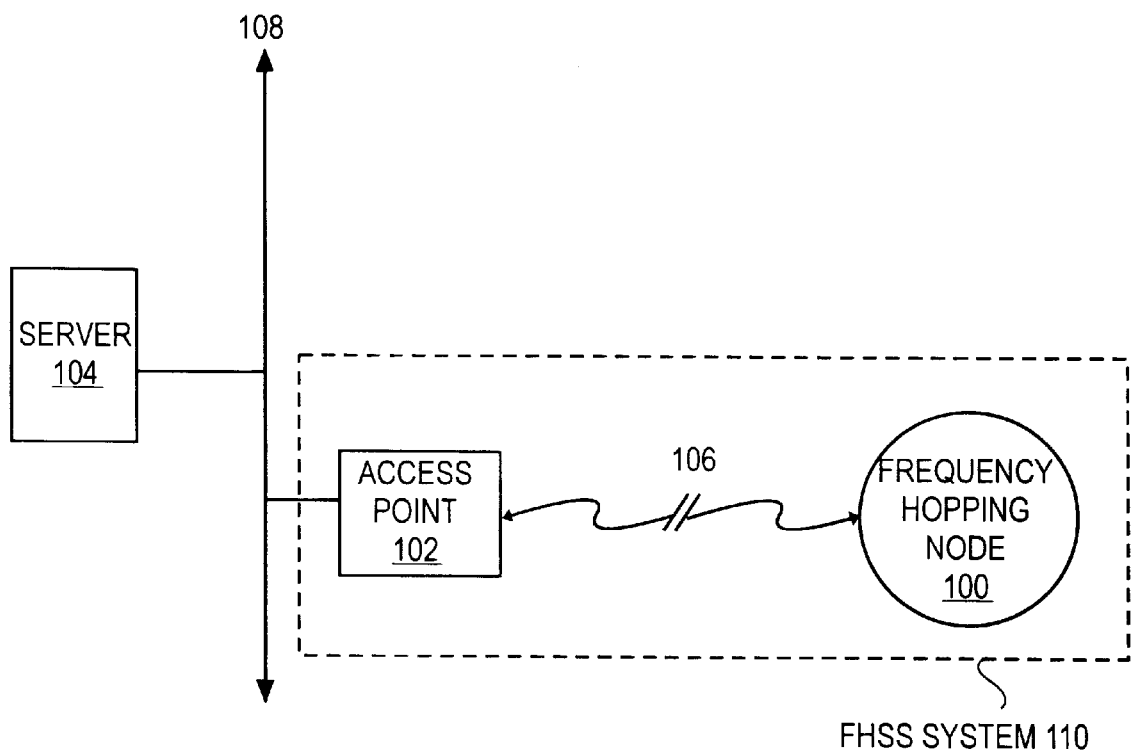
FIG. 1(a) illustrates a general block diagram of a frequency-hopping spread-spectrum (FHSS) system in one network configuration.

FIG. 1(a) demonstrates a general block diagram of a FHSS system in one network configuration. Specifically, FHSS system 110 comprises frequency-hopping node 100, wireless medium or electromagnetic airwaves, 106 and access point 102. Node 100 communicates with access point 102 through electromagnetic airwaves 106. Access point 102 also connects to wired network 108 in order to exchange data with server 104 or other devices coupled to wired network 108.

Figure 1B:
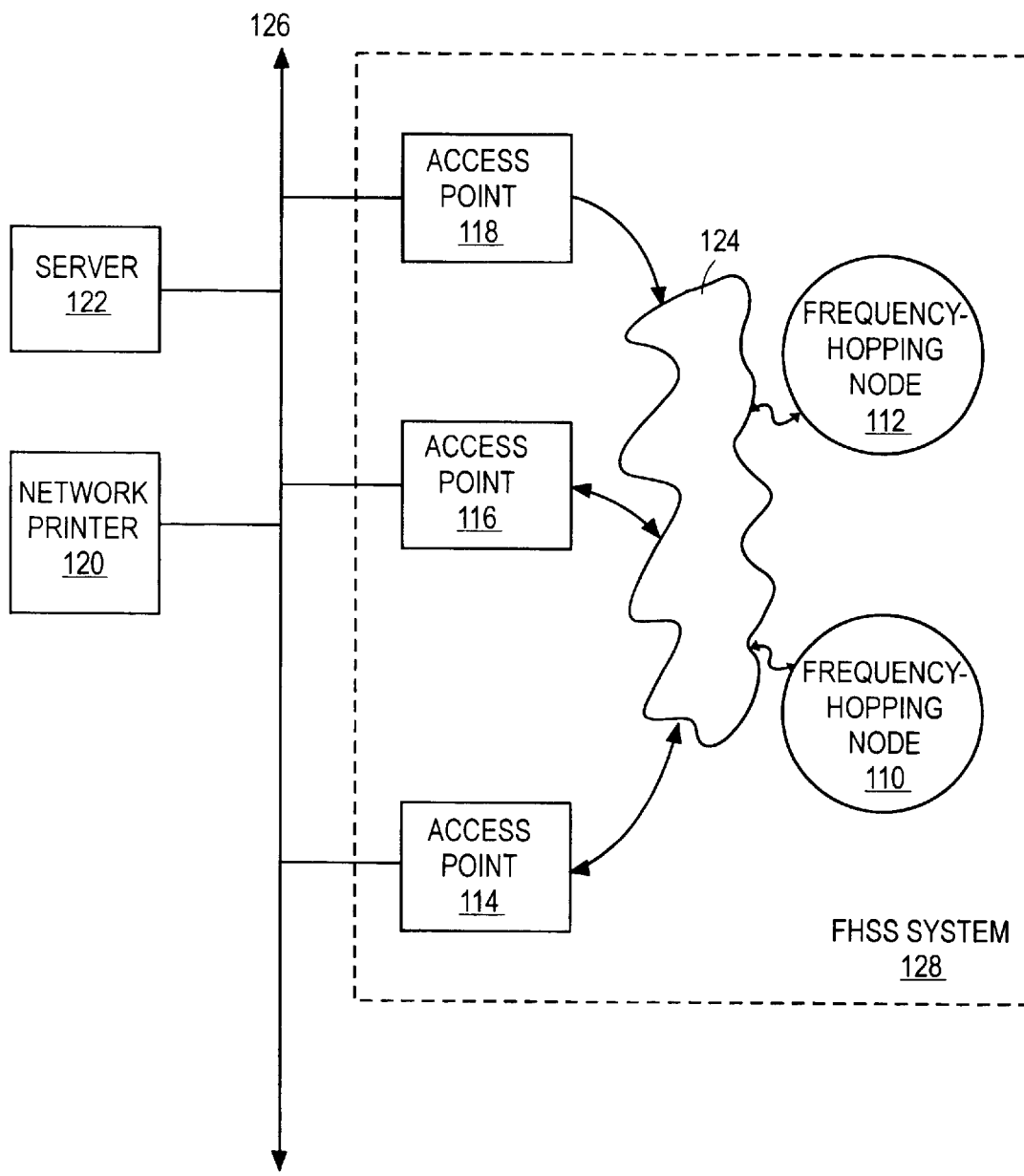
FIG. 1(b) illustrates a general block diagram of a FHSS system in another network configuration.

Similarly, FIG. 1(b) illustrates a general block diagram of a FHSS system in another network configuration. Instead of having only one frequency-hopping node and one access point, FHSS system 128 in FIG. 1(b) comprises multiple nodes 110 and 112, wireless medium 124 and multiple access points 114, 116 and 118. Frequency-hopping nodes 110 and 112 communicate with access points 114, 116. and 118 through electromagnetic airwaves 124. Access points 114, 116 and 118 connect to wired network 126 and have access to all the network resources such as, for example, network printer 120, server 122 or other devices coupled to wired network 126.

It should be noted that nodes 110 and 112 are not stationary and do not have to communicate with particular multiple access points. As an illustration, in FHSS system 128, node 110 can move seamlessly from access-point 114's coverage area to access point 118's while maintaining its data connections to access points 114 and 118. Similarly, node 112 can move from access point 118's coverage to access point 114's coverage area.

One type of electromagnetic airwaves 106 or 124 is radio waves. Often, radio waves are referred to as radio carriers. Using FIG. 1(a) as an illustration, before node 100 attempts to transmit information to access point 102 through wireless medium 106, node 100 superimposes the information on a radio carrier. In other words, node 100 modulates the radio carrier with the information before transmitting the modulated signal to access point 102. Conversely, if access point 102 attempts to transmit information from server 104 to node 100, access point 102 also has to first modulate the information with some radio carrier before transmitting the information.

Figure 2:
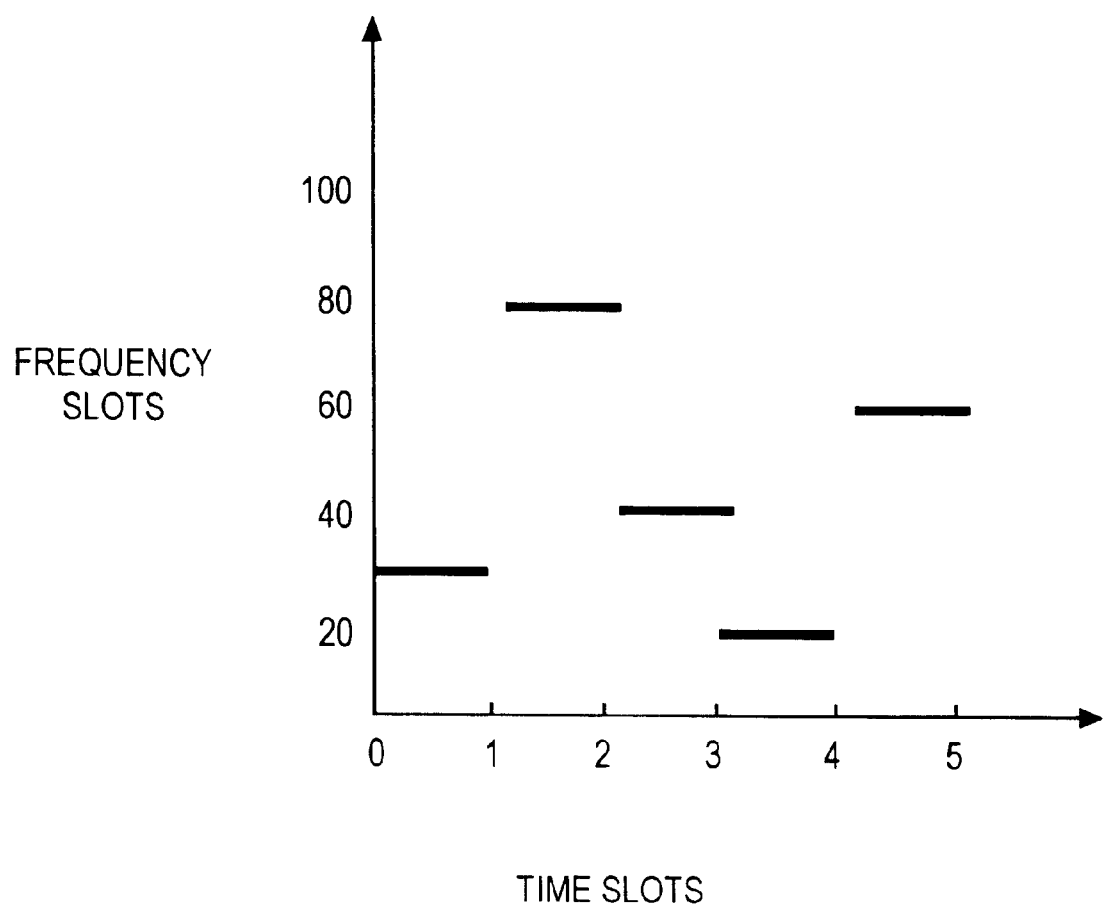
FIG. 2 illustrates the frequency-hopping mechanism in FHSS.

FHSS systems generally have a frequency switch, because FHSS technology uses a narrowband carrier that changes frequency in some pseudo-random pattern. In one embodiment, the frequency-hopping mechanism in a FHSS system splits information up across the time domain as shown in FIG. 2. Thus, when node 100 in FIG. 1(a) attempts to send information to access point 102, node 100's transmitter modulates a short burst of information at time slot 1 with a narrowband carrier at frequency slot 30 as shown in FIG. 2. Node 100's transmitter then quickly re-tunes to the next frequency channel, such as frequency slot 80, to transmit the next burst of information within time slot 2. The sequence of these frequency changes, or hops, made by node 100's transmitter is pseudo-random and is known by access point 102's receiver. With the knowledge of the frequency-hopping sequence, access point 102's receiver can then decipher the bursts of information received from node 100.

Figure 1C:
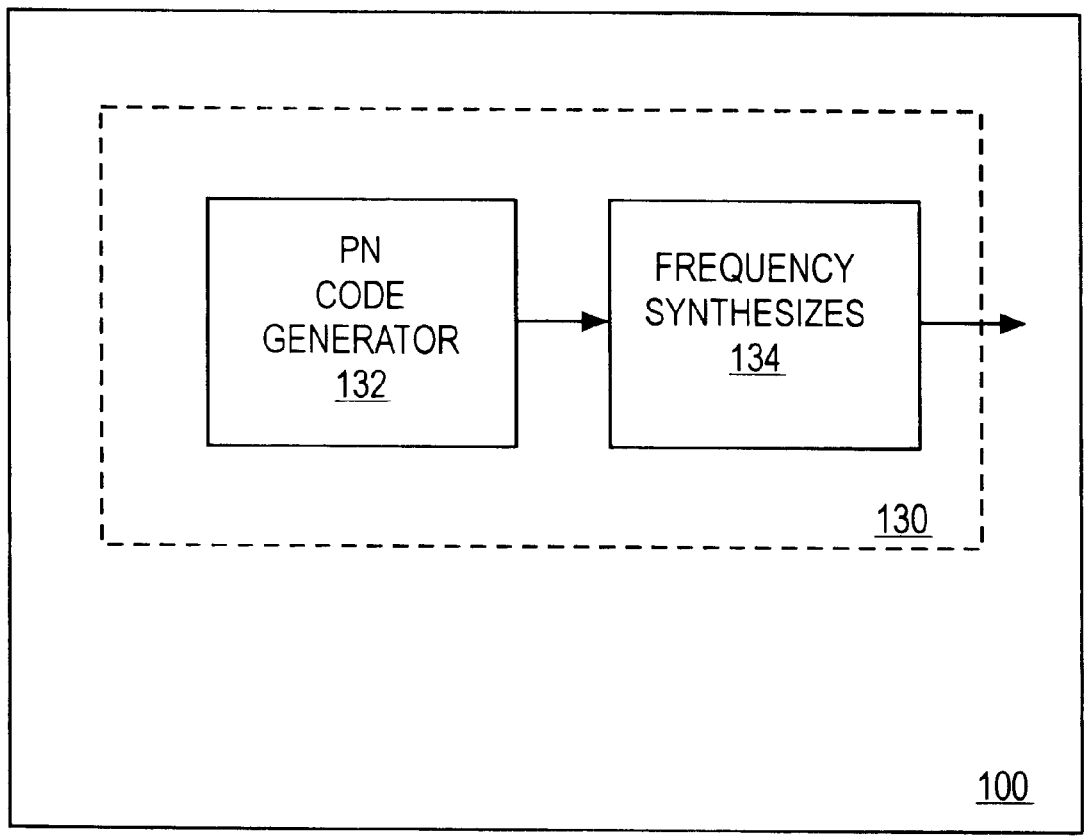
FIG. 1(c) illustrates a general block diagram of one embodiment of a transmitter's frequency switch components.

In order for node 100's transmitter 130 to quickly tune to a different frequency channel, transmitter 130's frequency switch typically comprises frequency synthesizer 134 and pseudo-noise (PN) code generator 132 as illustrated in FIG. 1(c). Specifically, PN generator 132 selects an appropriate frequency slot for each.time slot shown in FIG. 2 for the transmitter 130's transmission. On the other hand, receiver also has a PN generator to select the appropriate sequence of frequency slots corresponding to transmitter 130's sequence. Synchronization between the transmitter 130's PN code generator and the receiver's PN code generator leads to successful information exchanges. According to the output of the aforementioned PN code generators, frequency synthesizers generate signals with the corresponding frequencies.

Operation of a Non-freguency-hopping Node in a Frequency-hopping System

A non-frequency-hopping node and a method for using such a node to communicate in a frequency-hopping system are disclosed. Particularly, the non-frequency-hopping node first listens for an active signal generated by the frequency-hopping system on a predetermined frequency channel. Upon detecting the active signal, the non-frequency-hopping node communicates with the frequency-hopping system on the predetermined frequency channel at a time later in the transmission. The communication often occurs before the frequency-hopping system hops to a new frequency.

Figure 3:
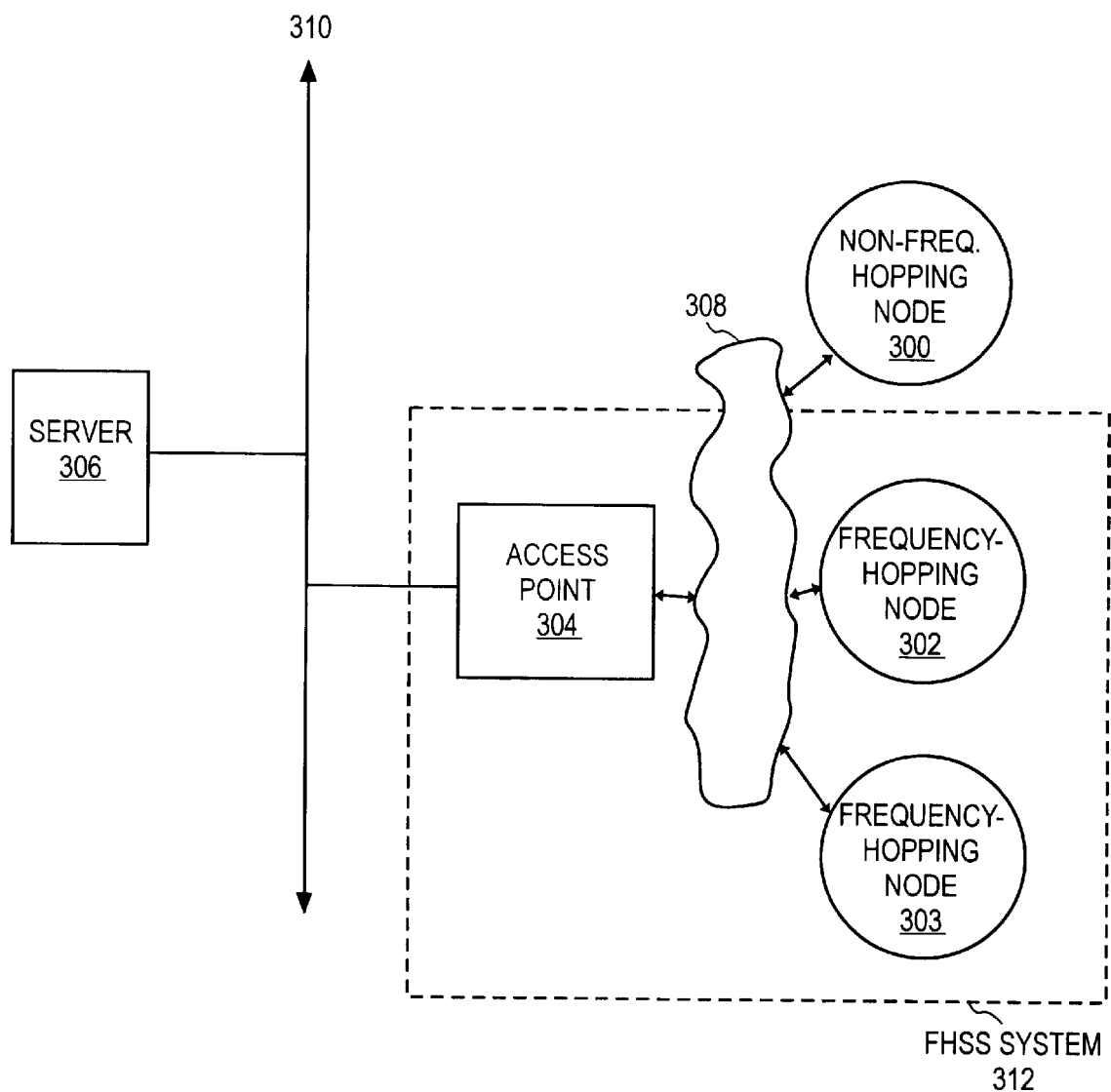
FIG. 3 illustrates a FHSS system in a network configuration with a non-frequency-hopping node.

FIG. 3 describes a FHSS system in a network configuration with non-frequency-hopping node 300. Similar to the network configuration shown in FIG. 1, non-frequency-hopping node 300 along with frequency-hopping nodes 302 and 303 communicate with access point 304 through wireless medium 308. Access point 304 connects to server 306 through wired network 310. An example for frequency-hopping node 302 or 303 can be, but not limited to, a notebook computer. As for non-frequency-hopping node 300, the node can be, but not limited to, a thermostat that transmits periodic room temperature information to access point 304 through wireless medium 308. In addition, frequency-hopping nodes 302 and 303 and access point 304 together with wireless medium 308 are considered parts of FHSS system 312.

As has been previously discussed, FHSS system 312 employs a frequency-hopping scheme, where the frequency switching pattern is pseudo-random and is known to both node 302 and access point 304. Because this frequency-hopping pattern switches between frequency channels every T seconds, a hop rate of 1/T hops per second is thus established. Moreover, if the frequency-hopping pattern consists of N frequencies, the entire hop sequence can repeat every N/T.

In one embodiment, FHSS system 312 not only implements a frequency-hopping scheme, it can also utilize a listen-before-talk network protocol. One such protocol is Carrier Sense Multiple Access with Collision Avoidance (CSMA/CA). In particular, CSMA/CA allows multiple users such as node 302 and node 303 to share the same wireless medium 308 during a hop dwell period. Therefore, when node 302 is ready to transmit data at one of the frequency channels in its frequency hop pattern, node 302 first verifies the availability of that frequency channel for transmission. If another node, such as node 303, already occupies the channel, node 302 waits until node 303 finishes. Aside from the described CSMA/CA, other network protocols with analogous functionality should be apparent to one ordinarily skilled in the art to apply to similar network configurations.

Figure 4:
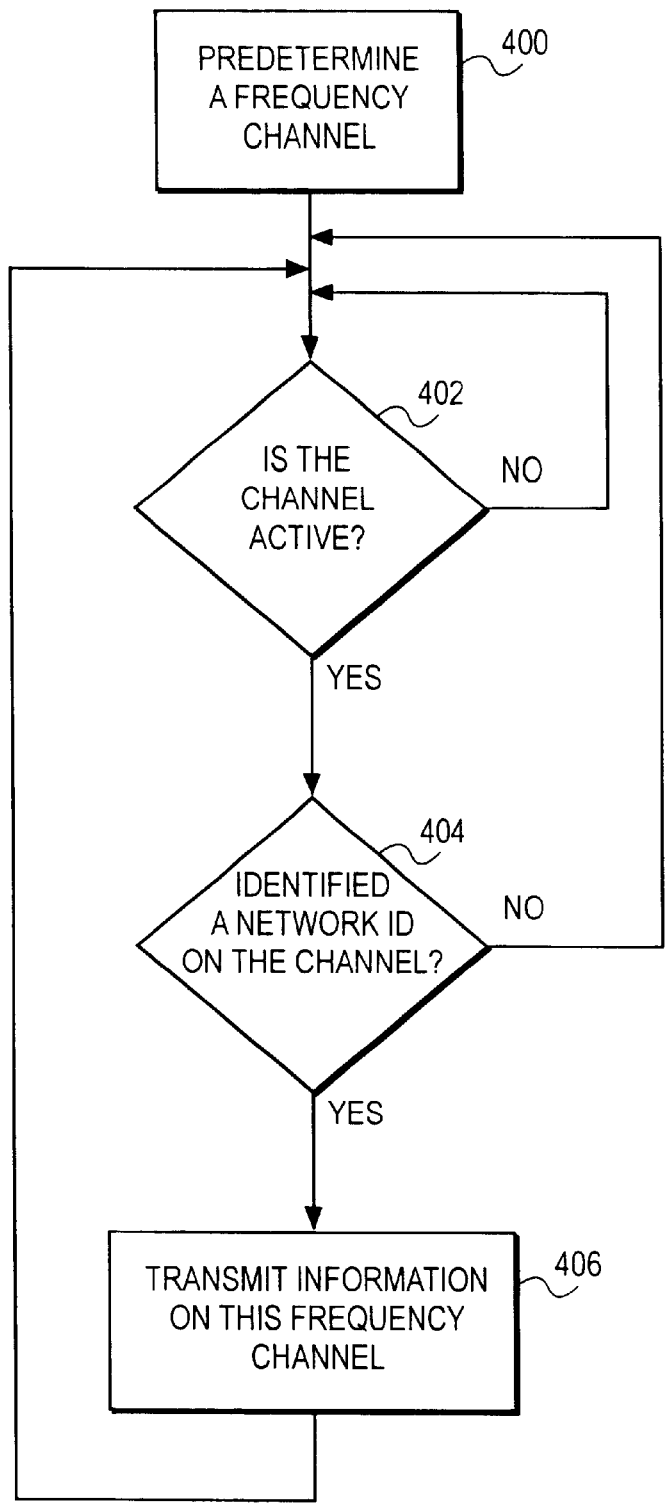
FIG. 4 illustrates a flow chart of the interaction between a non-frequency-hopping node and a FHSS system.

Interactions between non-frequency-hopping node 300 and FHSS system 312 are further described in the flow chart illustrated in FIG. 4. Using the previously mentioned notebook computer as node 302, a thermostat as node 300 and radio waves as wireless medium 308, the thermostat first predetermines a frequency channel to listen to in step 400. With some information ready for transmission, the thermostat checks for the activity in the frequency channel in step 402. If the notebook computer happens to transmit data on that particular frequency channel during its frequency-hopping pattern, the thermostat then receives an active indication from access point 304. In one embodiment, non-frequency-hopping node 300 further checks for a defined network ID known to both access point 304 and itself in step 404.

Since access point 304 only broadcasts this defined network ID on the predetermined frequency channel, assuming node 302's frequency hopping pattern has a total of N frequency slots, the thermostat detects this network ID once every N hops made by node 302. During the time when node 302 makes the other N−1 hops, the thermostat can remain in low power state and thus conserve its energy source. On the other hand, once the thermostat, or node 300, recognizes the network ID on the predetermined frequency channel, node 300 transmits its data to access point 304 on the same frequency channel in step 406 without having to perform frequency hopping.

Although thermostat's transmission may collide with other data transmissions on the same channel, access point 304 or other receivers may still receive and detect the thermostat's data. Because non-frequency-hopping node 300, such as the thermostat, tends to be located close to its intended receiver, node 300's data transmission likely possesses higher energy than nodes situating further away from the receiver. Consequently, access point 304 may be able to extract the stronger of the two overlapping radio signals without error due to the known capture effect principle.

In an alternative embodiment, non-frequency-hopping node 300's verification of network ID is only one technique to identify a proper medium to transmit data. Other identification tags, strings, etc. can be exchanged and used in place of the discussed network ID to achieve the same goal. It should further be apparent to one with ordinary skill in the art to include multiple access points in FHSS system 312 or even connect FHSS system 312 to another FHSS system.

Figure 5:
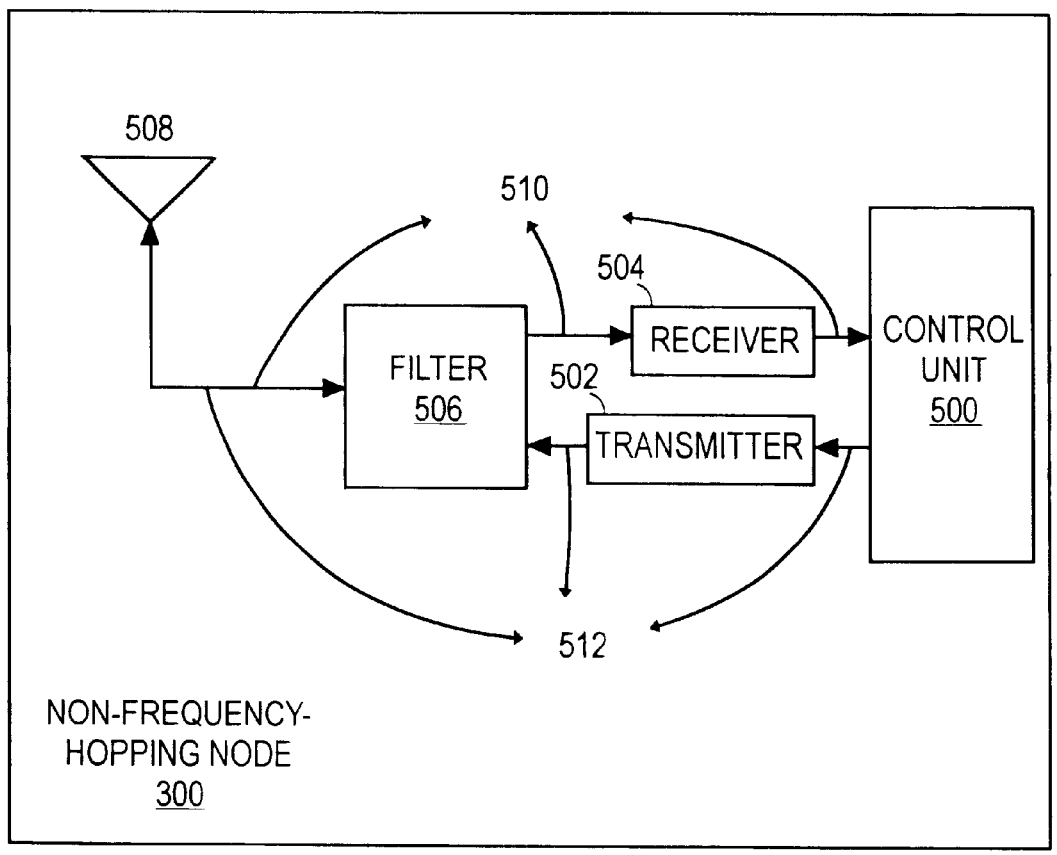
FIG. 5 illustrates a block diagram of a non-frequency-hopping node.

FIG. 5 illustrates a block diagram of non-frequency-hopping node 300. Non-frequency-hopping node 300 comprises control unit 500, transmitter 502, receiver 504, filter 506 and antenna 508. Transmitter 502 and receiver 504 share antenna 508. On receive path 510, filter 506 processes data received by antenna 508 by filtering out any data outside of a predetermined frequency range. Receiver 504 is responsible to process the filtered data and pass the resulting data to control unit 500. Control unit 500 proceeds to determine the availability of a frequency channel.

On transmit path 512, once control unit 500 establishes the availability of a frequency channel for transmission, control unit 500 sends the prepared data to transmitter 502. Transmitter 502 modulates the data with a carrier of proper frequency and sends the modulated signal to filter 506. Filter 506 again eliminates spurious data outside of the desired frequency range before transmitting the final filtered data through antenna 508.

Figure 6:
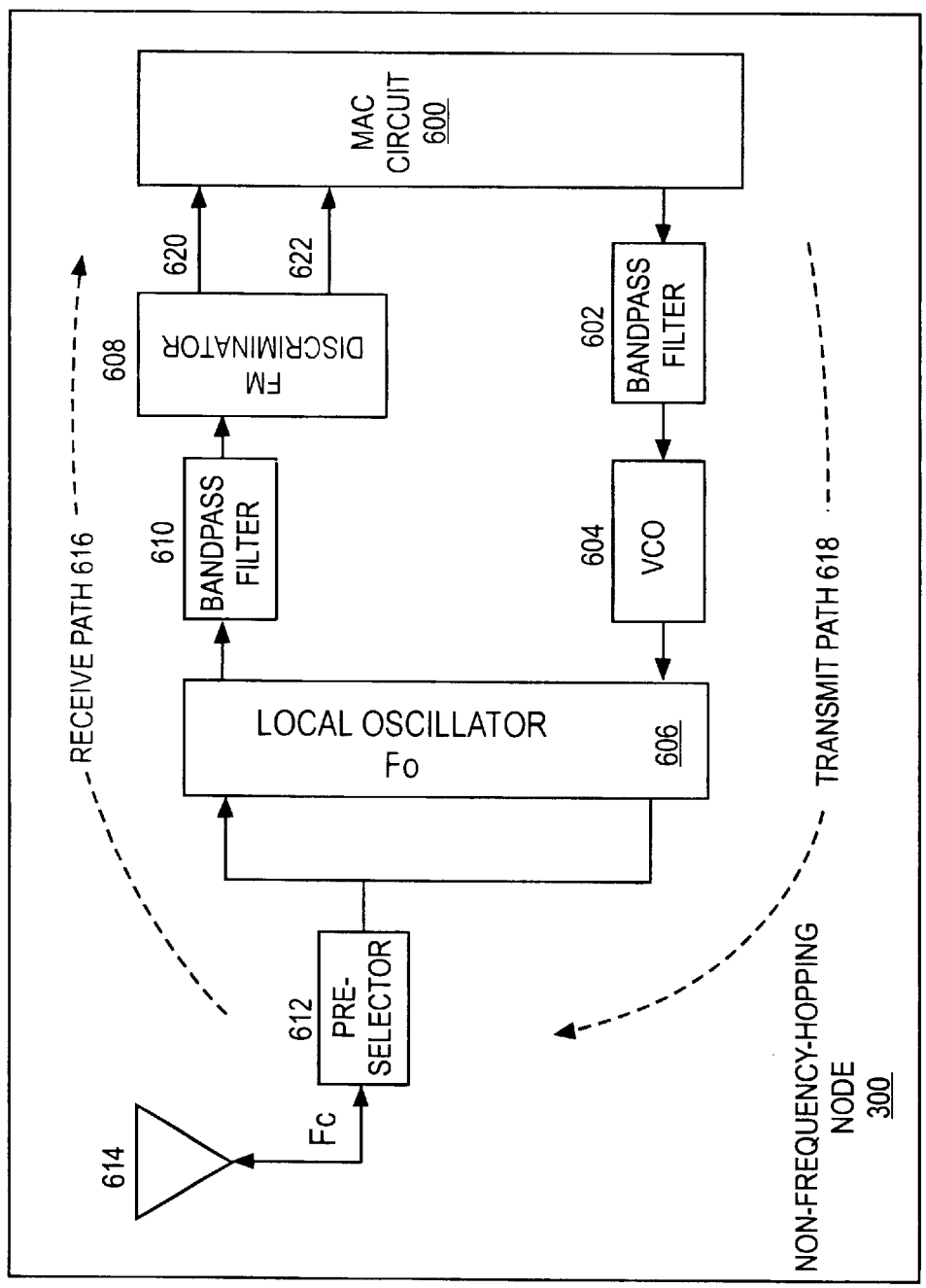
FIG. 6 illustrates a detailed block diagram of one embodiment of a non-frequency-hopping node.

FIG. 6 is a particular embodiment of node 300. Instead of filter 506, the embodiment in FIG. 6 has preselector 612, which is also responsible for filtering out data in undesirable frequency ranges. In receive path 616, local oscillator 606, centered at frequency $F_0$, is mixed with the incoming signal at frequency $F_c$. The mixing results in a sum component, $F_s = F_0 + F_c$ and a difference component, $F_d = F_0 - F_c$. Then, the difference component, $F_d$ goes through a signal detector. In this embodiment, the signal detector comprises bandpass filter 610 and as Frequency Modulation (FM) discriminator 608. Bandpass filter 610 has a bandwidth of at least one frequency channel of wireless medium 308 illustrated in FIG. 3. The output of bandpass filter 610 goes through FM discriminator 608, which produces signal 622 indicating the channel's activity and data bits 620. Similar to control unit 500 in FIG. 5, MAC circuit 600 determines whether to begin transmitting data through transmit path 618 based on its input data 622 and 620.

Transmit path 618 comprises bandpass filter 602, Voltage Control Oscillator (VCO) 604, local oscillator 606, preselector 612 and antenna 614. After MAC circuit 600 begins sending signals on transmit path 618, the signals first go through bandpass filter 602. The resulting filtered data are modulated by VCO 604. This modulated signal mixes with local oscillator 606 and generates frequency sum and difference components. Since both of these components are likely to be in the desired frequency band, antenna 614 can transmit either one of the two components after the final filtering stage at preselector 612.

Thus, a non-frequency-hopping node and a method for using such a node to transmit and receive data in a frequency-hopping system have been disclosed. Although the non-frequency-hopping node and the frequency-hopping system have been described particularly with reference to the figures, they may appear in any number of network configurations. It is further contemplated that many changes and modifications may be made by one of ordinary skill in the art without departing from the spirit and scope of the present disclosure.

What is claimed is:

1. A method, comprising:

listening by a non-frequency-hopping node for an active signal generated by a frequency-hopping system on a predetermined frequency channel; and exchanging data with the frequency-hopping system on the predetermined frequency channel upon detecting the active signal.

2. The method according to claim 1, wherein the method further comprises:

defining a commonly known network identification between the non-frequency-hopping node and the frequency-hopping system;

embedding the network identification in the active signal; and exchanging the data with the frequency-hopping system upon detecting the network identification.

3. The method according to claim 1, wherein the listening further comprises:

receiving the active signal through an antenna of the non-frequency-hopping node;

mixing the active signal with a local signal generated by a local oscillator of the non-frequency-hopping node; and passing the mixed signal through a signal detector of the non-frequency-hopping node to look for the active signal.

4. The method according to claim 1, wherein the exchanging further comprises:

receiving the data from the frequency-hopping system and passing the data through the non-frequency-hopping node's control unit; and preparing transmit data from the non-frequency-hopping node's control unit by filtering and mixing the transmit data with a local signal generated by the non-frequency-hopping node's local oscillator and sending the transmit data to the frequency-hopping system.

5. The method according to claim 1, wherein the non-frequency-hopping node and the frequency-hopping system utilize a listen-before-talk network protocol.

6. A non-frequency-hopping node for transmitting and receiving data in a frequency-hopping system, comprising:

an antenna;

a filter coupled to the antenna;

a receiver and a transmitter coupled to the filter; and a control unit coupled to the receiver and the transmitter, wherein the control unit listens for an active signal generated by the frequency-hopping system on a predetermined frequency channel and upon detecting the active signal, transmits information through the transmitter, the filter and the antenna to the frequency-hopping system on the predetermined frequency channel.

7. The non-frequency-hopping node according to claim 6, wherein the active signal further comprises:

a network identification commonly known to the non-frequency-hopping node and the frequency-hopping system.

8. The non-frequency-hopping node according to claim 7, wherein the control unit transmits information to the frequency-hopping system on the predetermined frequency channel upon detecting the network identification.

9. The non-frequency-hopping node according to claim 6, wherein the receiver further comprises:

a local oscillator; and a signal detector coupled to the local oscillator, wherein the signal detector searches for the active signal.

10. The non-frequency-hopping node according to claim 6, wherein the transmitter further comprises:

a bandpass filter;

a Voltage Control Oscillator (VCO) coupled to the bandpass filter; and a local oscillator coupled to the VCO.

11. The non-frequency-hopping node according to claim 9, wherein the signal detector further comprises:

(a) a bandpass filter; and (b) a Frequency Modulation (FM) discriminator coupled to the bandpass filter.

12. The non-frequency-hopping node according to claim 6, wherein the non-frequency-hopping node and the frequency-hopping system utilize a listen-before-talk network protocol.

13. A network system, comprising:

a frequency-hopping spread-spectrum (FHSS) system, further comprising:

a wireless medium;

a frequency-hopping node coupled to the wireless medium; and an access point coupled to the wireless medium; and a non-frequency-hopping node coupled to the wireless medium, wherein the non-frequency-hopping node listens for an active signal generated by the FHSS system on a predetermined frequency channel and upon detecting the active signal, exchanges information with the FHSS system on the predetermined frequency channel.

14. A network system, comprising:

a frequency-hopping spread-spectrum (FHSS) system, further comprising:

a wireless medium;

a frequency-hopping node coupled to the wireless medium; and an access point coupled to the wireless medium; and a non-frequency-hopping node coupled to the wireless medium, wherein the non-frequency-hopping node listens for an active signal generated by the FHSS system on a predetermined frequency channel and upon detecting the active signal, exchanges information with the FHSS system on the predetermined frequency channel, wherein the access point in the FHSS system generates the active signal when the frequency-hopping node utilizes the predetermined frequency channel.

15. The network system according to claim 13, wherein the active signal further comprises:

a network identification commonly known to the non-frequency-hopping node and the FHSS system.

16. The network system according to claim 15, wherein the non-frequency-hopping node exchanges information with the FHSS system on the predetermined frequency channel upon detecting the network identification.

17. The network system according to claim 13, wherein the access point further connects to a wired network and has access to resources on the wired network.

18. The network system according to claim 13, wherein the non-frequency-hopping node and the FHSS system utilize a listen-before-talk network protocol.

* * * * *